United States Patent
Eim et al.

(10) Patent No.: US 10,479,885 B2
(45) Date of Patent: Nov. 19, 2019

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Sung Oh Eim, Uiwang-si (KR); Young Chul Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/698,999

(22) Filed: Sep. 8, 2017

(65) Prior Publication Data

US 2018/0086906 A1 Mar. 29, 2018

(30) Foreign Application Priority Data

Sep. 29, 2016 (KR) .................. 10-2016-0125256

(51) Int. Cl.
C08L 25/12 (2006.01)
F25D 23/08 (2006.01)
F25D 23/06 (2006.01)

(52) U.S. Cl.
CPC .............. *C08L 25/12* (2013.01); *F25D 23/08* (2013.01); *C08L 2205/025* (2013.01); *C08L 2205/035* (2013.01); *F25D 23/066* (2013.01)

(58) Field of Classification Search
CPC .... C08L 25/12; C08L 55/02; C08L 2205/025; C08L 2205/035
See application file for complete search history.

(56) References Cited

U.S. PATENT DOCUMENTS

| 5,747,587 | A | 5/1998 | Kim et al. | |
| 5,872,184 | A | 2/1999 | Mori et al. | |
| 5,889,113 | A | 3/1999 | Mori et al. | |
| 7,396,877 | B2 | 7/2008 | Cha et al. | |
| 2004/0054077 | A1* | 3/2004 | Chung | C08L 25/12 525/63 |
| 2014/0186612 | A1 | 7/2014 | Kwon et al. | |

FOREIGN PATENT DOCUMENTS

| CN | 1099775 A | 3/1995 |
| CN | 1481420 A | 3/2004 |
| CN | 1989201 A | 6/2007 |
| CN | 103910948 A | 7/2014 |
| CN | 103958599 A | 7/2014 |
| KR | 10-1998-0009375 A | 6/1999 |
| KR | 10-2008-0041363 A | 5/2008 |
| KR | 10-2009-0073453 A | 7/2009 |

OTHER PUBLICATIONS

Office Action in counterpart Chinese Application No. 201710767524.7 dated Jun. 25, 2019, pp. 1-6.

* cited by examiner

Primary Examiner — Jeffrey C Mullis
(74) Attorney, Agent, or Firm — Additon, Higgins & Pendleton, P.A.

(57) ABSTRACT

A thermoplastic resin composition includes: a first rubber-modified vinyl graft copolymer obtained by grafting a monomer mixture including an aromatic vinyl monomer and a vinyl cyanide monomer to a diene rubber polymer; a second rubber-modified vinyl graft copolymer obtained by grafting a monomer mixture including an aromatic vinyl monomer and a vinyl cyanide monomer to an acrylate rubber polymer; a first aromatic vinyl-vinyl cyanide copolymer having a weight average molecular weight of about 250,000 g/mol to about 450,000 g/mol and including about 25 wt % to about 31 wt % of a repeat unit derived from a vinyl cyanide monomer; a second aromatic vinyl-vinyl cyanide copolymer having a weight average molecular weight of about 70,000 g/mol to about 150,000 g/mol and including about 33 wt % to about 42 wt % of a repeat unit derived from a vinyl cyanide monomer; and a third aromatic vinyl-vinyl cyanide copolymer having a weight average molecular weight of about 70,000 g/mol to about 150,000 g/mol and including about 25 wt % to about 31 wt % of a repeat unit derived from a vinyl cyanide monomer. The thermoplastic resin composition can have excellent properties in terms of chemical resistance, stiffness, impact resistance, and the like.

11 Claims, No Drawings

THERMOPLASTIC RESIN COMPOSITION AND ARTICLE PRODUCED THEREFROM

CROSS-REFERENCE TO RELATED APPLICATION

This application claims priority under 35 USC Section 119 to and the benefit of Korean Patent Application 10-2016-0125256, filed on Sep. 29, 2016, the entire disclosure of which is incorporated herein by reference.

FIELD OF THE INVENTION

The present invention relates to a thermoplastic resin composition and a molded article formed of the same.

BACKGROUND

Generally, a portion of a joint between an outer steel plate of a refrigerator and an inner resin molded part thereof is assembled by a table board, a lid, and chassis, all of which are formed by injection molding of resins. Typically, liquid urethane is injected between inner and outer walls of the refrigerator, followed by foaming and solidification at a proper temperature, to form a heat insulation layer of the refrigerator. In the liquid urethane, which is a raw material of such a foamed polyurethane heat insulation layer, a foaming agent such as Freon is used to produce a foam. Such a foaming agent usually remains in the foam even after foaming, thereby improving heat insulation performance.

However, the foaming agent contacts and chemically erodes a resin portion at which stress is concentrated during manufacture or use of a refrigerator, thereby causing cracking of a resin molded article. Thus, a resin for refrigerators is required to be resistant to the foaming agent.

Generally, rubber-modified aromatic vinyl copolymer resins such as an acrylonitrile-butadiene-styrene copolymer (ABS) resin have been mainly used as a resin for refrigerators. This is because the ABS resin has excellent properties in terms of stiffness, impact resistance and moldability, has high gloss to provide good appearance, and exhibits excellent chemical resistance to Freon (CFC-11), which is used as a foaming agent for hard urethane foams.

However, as existing foaming agents have been found to destroy the ozone layer, eco-friendly foaming agents such as hydrofluoroolefin (HFO) foaming agents, which have very low global warming potential (GWP) and ozone depletion potential (ODP) values and high foaming efficiency, are being developed. Such eco-friendly foaming agents cause stronger chemical erosion than existing foaming agents, and thus a resin for refrigerators used with the eco-friendly foaming agents is also required to have a higher level of chemical resistance.

For example, high impact polystyrene (HIPS) is chemically resistant enough to prevent cracking due to chemical erosion caused by HFO foaming agents. However, since HIPS has limitations in stiffness, impact resistance, and appearance, it is difficult to apply HIPS to medium and large size refrigerators.

Therefore, there is a need for a thermoplastic resin composition which has excellent properties in terms of chemical resistance, stiffness, and impact resistance to prevent chemical erosion caused by eco-friendly foaming agents and can be applied to various applications such as a material for a refrigerator inner case.

SUMMARY OF THE INVENTION

A thermoplastic resin composition is provided which can have has excellent properties in terms of chemical resistance, stiffness, and/or impact resistance, and the like, and a molded article formed of the same is also provided.

The thermoplastic resin composition includes: a first rubber-modified vinyl graft copolymer obtained by grafting a monomer mixture including an aromatic vinyl monomer and a vinyl cyanide monomer to a diene rubber polymer; a second rubber-modified vinyl graft copolymer obtained by grafting a monomer mixture including an aromatic vinyl monomer and a vinyl cyanide monomer to an acrylate rubber polymer; a first aromatic vinyl-vinyl cyanide copolymer having a weight average molecular weight of about 250,000 g/mol to about 450,000 g/mol and including about 25 wt % to about 31 wt % of a repeat unit derived from a vinyl cyanide monomer; a second aromatic vinyl-vinyl cyanide copolymer having a weight average molecular weight of about 70,000 g/mol to about 150,000 g/mol and including about 33 wt % to about 42 wt % of a repeat unit derived from a vinyl cyanide monomer; and a third aromatic vinyl-vinyl cyanide copolymer having a weight average molecular weight of about 70,000 g/mol to about 150,000 g/mol and including about 25 wt % to about 31 wt % of a repeat unit derived from a vinyl cyanide monomer.

In exemplary embodiments, the thermoplastic resin composition may include about 10 wt % to about 30 wt % of the first rubber-modified vinyl graft copolymer, about 1 wt % to about 15 wt % of the second rubber-modified vinyl graft copolymer, about 10 wt % to about 40 wt % of the first aromatic vinyl-vinyl cyanide copolymer, about 20 wt % to about 60 wt % of the second aromatic vinyl-vinyl cyanide copolymer, and about 1 wt % to about 15 wt % of the third aromatic vinyl-vinyl cyanide copolymer, each based on 100 wt % of the thermoplastic resin composition.

In exemplary embodiments, each of the diene rubber polymer and the acrylate rubber polymer may have an average particle diameter of about 0.1 µm to about 0.4 µm. The diene rubber polymer and the acrylate rubber polymer may have the same average particle diameters or different average particle diameters.

In exemplary embodiments, the thermoplastic resin composition may further include a rubber-modified aromatic vinyl copolymer resin including a rubber polymer having an average particle diameter of about 1 µm to about 10 µm.

In exemplary embodiments, the rubber-modified aromatic vinyl copolymer resin may be present in an amount of about 1 part by weight to about 10 parts by weight relative to about 100 parts by weight of the thermoplastic resin composition.

In exemplary embodiments, the thermoplastic resin composition may have a tensile strength of about 450 MPa to about 600 MPa, as measured on a 3.2 mm thick specimen in accordance with ASTM D638.

In exemplary embodiments, the thermoplastic resin composition may have a notched Izod impact strength of about 25 kgf·cm/cm to about 40 kgf·cm/cm, as measured on a ⅛" thick specimen in accordance with ASTM D256.

A molded article formed of the thermoplastic resin composition as set forth above is also provided.

In exemplary embodiments, the molded article may be an inner case of a refrigerator.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

Hereinafter, embodiments of the present invention will be described in detail.

A thermoplastic resin composition according to the present invention includes: (A) a first rubber-modified vinyl graft copolymer; (B) a second rubber-modified vinyl graft copolymer; (C) a first aromatic vinyl-vinyl cyanide copolymer; (D) a second aromatic vinyl-vinyl cyanide copolymer; and (E) a third aromatic vinyl-vinyl cyanide copolymer.

(A) First Rubber-Modified Vinyl Graft Copolymer

The first rubber-modified vinyl graft copolymer according to embodiments of the present invention can serve to improve impact resistance of the thermoplastic resin composition, and may be obtained by grafting a monomer mixture including an aromatic vinyl monomer and a vinyl cyanide monomer to a diene rubber polymer. The monomer mixture may further include a monomer imparting processability and heat resistance, as needed. Here, grafting may be performed by any known polymerization method, such as emulsion polymerization and suspension polymerization.

Examples of the diene rubber polymer may include polybutadiene, poly(styrene-butadiene), and poly(acrylonitrile-butadiene), without being limited thereto. These may be used alone or as a mixture thereof. For example, the diene rubber polymer may be a butadiene rubber, such as polybutadiene.

In exemplary embodiments, the diene rubber polymer (rubber particles) may have an average (Z-average) particle diameter of about 0.1 μm to about 0.4 μm, for example, about 0.2 μm to about 0.4 μm. When the average particle diameter of the diene rubber polymer falls within this range, the thermoplastic resin composition can have excellent properties in terms of impact resistance, appearance, and the like.

In exemplary embodiments, the first rubber-modified vinyl graft copolymer can include the diene rubber polymer in an amount of about 20 wt % to about 65 wt %, for example, about 30 wt % to about 60 wt %, based on the total weight (100 wt %) of the first rubber-modified vinyl graft copolymer and the monomer mixture (including the aromatic vinyl monomer and the vinyl cyanide monomer) in an amount of about 35 wt % to about 80 wt %, for example, about 40 wt % to about 70 wt %, based on the total weight (100 wt %) of the first rubber-modified vinyl graft copolymer.

In some embodiments, the first rubber-modified vinyl graft copolymer can include the diene rubber polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments, the amount of the diene rubber polymer can be in a range from about any of the foregoing amounts to about any other of the foregoing amounts.

In some embodiments, the first rubber-modified vinyl graft copolymer can include the monomer mixture in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer mixture can be in a range from about any of the foregoing amounts to about any other of the foregoing amounts.

When the amounts of the diene rubber polymer and monomer mixture fall within these ranges, the thermoplastic resin composition can have excellent properties in terms of impact resistance, flowability, and the like.

The aromatic vinyl monomer is graft-copolymerizable with the diene rubber polymer. Examples of the aromatic vinyl monomer may include styrene, α-methylstyrene, β-methyl styrene, p-methyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof.

The monomer mixture can include the aromatic vinyl monomer in an amount of about 50 wt % to about 90 wt %, for example, about 60 wt % to about 80 wt %, based on the total weight (100 wt %) of the monomer mixture. In some embodiments, the monomer mixture can include the aromatic vinyl monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts.

When the amount of the aromatic vinyl monomer falls within this range, the thermoplastic resin composition can have excellent properties in terms of impact resistance, flowability, and the like.

The vinyl cyanide monomer is copolymerizable with the aromatic vinyl monomer. Examples of the vinyl cyanide monomer may include acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may be acrylonitrile and/or methacrylonitrile.

The monomer mixture can include the vinyl cyanide monomer in an amount of about 10 wt % to about 50 wt %, for example, about 20 wt % to about 40 wt %, based on the total weight (100 wt %) of the monomer mixture. In some embodiments, the monomer mixture can include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the vinyl cyanide monomer can be in a range from about any of the foregoing amounts to about any other of the foregoing amounts.

When the amount of the vinyl cyanide monomer falls within this range, the thermoplastic resin composition can have excellent properties in terms of impact resistance, flowability, and the like.

Examples of the monomer imparting processability and heat resistance may include (meth)acrylic acid, maleic anhydride, and N-substituted maleimide, without being limited thereto. These may be used alone or as a mixture thereof.

When the monomer imparting processability and heat resistance is used, the monomer mixture can include the monomer imparting processability and heat resistance in an amount of about 15 wt % or less, for example, about 0.1 wt % to about 10 wt %, based on the total weight (100 wt %) of the monomer mixture. In some embodiments, the monomer mixture can include the monomer imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer imparting processability and heat resistance can be in a range from about any of the foregoing amounts to about any other of the foregoing amounts.

Within this range, the monomer imparting processability and heat resistance can impart processability and heat resistance to the thermoplastic resin composition with minimum or no deterioration in other properties.

Examples of the first rubber-modified vinyl graft copolymer may include an acrylonitrile-butadiene-styrene graft copolymer (g-ABS), without being limited thereto.

In exemplary embodiments, the thermoplastic resin composition can include the first rubber-modified vinyl graft copolymer in an amount of about 10 wt % to about 30 wt %, for example, about 15 wt % to about 25 wt %, based on the total weight (100 wt %) of the thermoplastic resin composition, that is, the total weight of components (A) to (E). In some embodiments, the thermoplastic resin composition can include the first rubber-modified vinyl graft copolymer in an amount of about 10, 11, 12, 13, 14, 15, 16, 17, 18, 19, 20, 21, 22, 23, 24, 25, 26, 27, 28, 29, or 30 wt %. Further, according to some embodiments, the amount of the first rubber-modified vinyl graft copolymer can be in a range from about any of the foregoing amounts to about any other of the foregoing amounts.

When the amount of the first rubber-modified vinyl graft copolymer falls within this range, the thermoplastic resin composition can have excellent properties in terms of chemical resistance, stiffness, impact resistance, flowability, and balance therebetween.

(B) Second Rubber-Modified Vinyl Graft Copolymer

The second rubber-modified vinyl graft copolymer according to embodiments can serve to improve chemical resistance and impact resistance of the thermoplastic resin composition, and may be obtained by grafting a monomer mixture including an aromatic vinyl monomer and a vinyl cyanide monomer to an acrylate rubber polymer. The monomer mixture may further include a monomer imparting processability and heat resistance, as needed. Here, grafting may be performed by any known polymerization method, such as emulsion polymerization and suspension polymerization.

Examples of the acrylate rubber polymer may include polyalkyl (meth)acrylate (co)polymers, without being limited thereto. These may be used alone or as a mixture thereof. As used herein, "alkyl" refers to C1-C10 alkyl.

In exemplary embodiments, the acrylate rubber polymer (rubber particles) may have an average (Z-average) particle diameter of about 0.1 μm to about 0.4 μm, for example, about 0.1 μm to about 0.3 μm. When the average particle diameter of the acrylate rubber polymer falls within this range, the thermoplastic resin composition can have excellent properties in terms of impact resistance, appearance, and the like.

In exemplary embodiments, the second rubber-modified vinyl graft copolymer can include the acrylate rubber polymer in an amount of about 20 wt % to about 65 wt %, for example, about 30 wt % to about 60 wt %, based on the total weight (100 wt %) of the second rubber-modified vinyl graft copolymer and the monomer mixture (including the aromatic vinyl monomer and the vinyl cyanide monomer) in an amount of about 35 wt % to about 80 wt %, for example, about 40 wt % to about 70 wt %, based on the total weight (100 wt %0 of the second rubber-modified vinyl graft copolymer.

In some embodiments, the second rubber-modified vinyl graft copolymer can include the acrylate rubber polymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments, the amount of the acrylate rubber polymer can be in a range from about any of the foregoing amounts to about any other of the foregoing amounts.

In some embodiments, the second rubber-modified vinyl graft copolymer can include the monomer mixture in an amount of about 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer mixture can be in a range from about any of the foregoing amounts to about any other of the foregoing amounts.

When the amounts of the acrylate rubber polymer and monomer mixture fall within these ranges, the thermoplastic resin composition can have excellent properties in terms of impact resistance, flowability, and the like.

The aromatic vinyl monomer is graft-copolymerizable with the acrylate rubber polymer. Examples of the aromatic vinyl monomer may include styrene, α-methylstyrene, β-methyl styrene, p-methyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof.

The monomer mixture can include the aromatic vinyl monomer in an amount of about 50 wt % to about 90 wt %, for example, about 60 wt % to about 80 wt %, based on the total weight (100 wt %) of the monomer mixture. In some embodiments, the monomer mixture can include the aromatic vinyl monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts.

When the amount of the aromatic vinyl monomer falls within this range, the thermoplastic resin composition can have excellent properties in terms of impact resistance, flowability, and the like.

The vinyl cyanide monomer is copolymerizable with the aromatic vinyl monomer. Examples of the vinyl cyanide monomer may include acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may be acrylonitrile and/or methacrylonitrile.

The monomer mixture can include the vinyl cyanide monomer in an amount of about 10 wt % to about 50 wt %, for example, about 20 wt % to about 40 wt %, based on the total weight (100 wt %) of the monomer mixture. In some embodiments, the monomer mixture can include the vinyl cyanide monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the vinyl cyanide monomer can be in a range from about any of the foregoing amounts to about any other of the foregoing amounts.

When the amount of the vinyl cyanide monomer falls within this range, the thermoplastic resin composition can have excellent properties in terms of impact resistance, flowability, and the like.

Examples of the monomer imparting processability and heat resistance may include (meth)acrylic acid, maleic anhydride, and N-substituted maleimide, without being limited thereto. These may be used alone or as a mixture thereof.

When the monomer imparting processability and heat resistance is used, the monomer mixture can include the monomer imparting processability and heat resistance in an amount of about 15 wt % or less, for example, about 0.1 wt % to about 10 wt %, based on the total weight (100 wt %) of the monomer mixture. In some embodiments, the monomer mixture can include the monomer imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer imparting processability and heat resistance can be in a range from about any of the foregoing amounts to about any other of the foregoing amounts.

Within this range, the monomer imparting processability and heat resistance can impart processability and heat resistance to the thermoplastic resin composition with minimum or no deterioration in other properties.

Examples of the second rubber-modified vinyl graft copolymer may include an acrylate-styrene-acrylonitrile graft copolymer (g-ASA), without being limited thereto.

In exemplary embodiments, the thermoplastic resin composition can include the second rubber-modified vinyl graft copolymer in an amount of about 1 wt % to about 15 wt %, for example, about 1 wt % to about 10 wt %, based on the total weight (100 wt %) of the thermoplastic resin composition, that is, the total weight of components (A) to (E). In some embodiments, the thermoplastic resin composition can include the second rubber-modified vinyl graft copolymer in an amount of about 1, 2, 3, 4, 5, 6, 7, 8, 9, 10, 11, 12, 13, 14, and 15 wt %. Further, according to some embodiments, the amount of the second rubber-modified vinyl graft copolymer can be in a range from about any of the foregoing amounts to about any other of the foregoing amounts.

When the amount of the second rubber-modified vinyl graft copolymer falls within this range, the thermoplastic resin composition can have excellent properties in terms of chemical resistance, stiffness, impact resistance, flowability, and balance therebetween.

(C) First Aromatic Vinyl-Vinyl Cyanide Copolymer

The first aromatic vinyl-vinyl cyanide copolymer according to embodiments of the present invention can serve to improve chemical resistance and flowability of the thermoplastic resin composition in combination with the second and third aromatic vinyl-vinyl cyanide copolymers.

The first aromatic vinyl-vinyl cyanide copolymer, the second aromatic vinyl-vinyl cyanide copolymer, and the third aromatic vinyl-vinyl cyanide copolymer do not include a rubber polymer and further are different from one another.

The first aromatic vinyl-vinyl cyanide copolymer may be obtained by polymerizing a monomer mixture including an aromatic vinyl monomer and a vinyl cyanide monomer, and can have a weight average molecular weight of about 250,000 g/mol to about 450,000 g/mol and can include about 25 wt % to about 31 wt % of a repeat unit derived from the vinyl cyanide monomer. For example, the first aromatic vinyl-vinyl cyanide copolymer is a copolymer including repeat units respectively derived from an aromatic vinyl monomer and a vinyl cyanide monomer, and may be obtained by reacting the monomer mixture by any known polymerization method such that the weight average molecular weight and repeat unit content of the copolymer fall within the aforementioned ranges. The monomer mixture may further include a monomer imparting processability and heat resistance, as needed, thereby obtaining the first aromatic vinyl-vinyl cyanide copolymer further including a repeat unit derived from the monomer imparting processability and heat resistance.

The aromatic vinyl monomer can form a repeat unit derived from the aromatic vinyl monomer through polymerization with the vinyl cyanide monomer. Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof.

The monomer mixture can include the aromatic vinyl monomer (the repeat unit derived from the aromatic vinyl monomer) in an amount of about 69 wt % to about 75 wt %, for example, about 70 wt % to about 74 wt %, based on the total weight (100 wt %) of the monomer mixture (of the first aromatic vinyl-vinyl cyanide copolymer). In some embodiments, the monomer mixture can include the aromatic vinyl monomer in an amount of about 69, 70, 71, 72, 73, 74, or 75 wt %. Further, according to some embodiments, the amount of the aromatic vinyl monomer can be in a range from about any of the foregoing amounts to about any other of the foregoing amounts.

When the amount of the aromatic vinyl monomer falls within this range, the thermoplastic resin composition can have excellent properties in terms of chemical resistance, flowability, and the like.

The vinyl cyanide monomer can form a repeat unit derived from the vinyl cyanide monomer through polymerization with the aromatic vinyl monomer. Examples of the vinyl cyanide monomer may include acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may be acrylonitrile and/or methacrylonitrile.

The monomer mixture can include the vinyl cyanide monomer (the repeat unit derived from the vinyl cyanide monomer) in an amount of about 25 wt % to about 31 wt %, for example, about 26 wt % to about 30 wt %, based on the total weight (100 wt %) of the monomer mixture (of the first aromatic vinyl-vinyl cyanide copolymer). In some embodiments, the monomer mixture can include the vinyl cyanide monomer in an amount of about 25, 26, 27, 28, 29, 30, or 31 wt %. Further, according to some embodiments, the amount of the vinyl cyanide monomer can be in a range from about any of the foregoing amounts to about any other of the foregoing amounts.

If the amount of the repeat unit derived from the vinyl cyanide monomer is less than about 25 wt %, the thermoplastic resin composition can have poor chemical resistance, whereas if the amount of the repeat unit derived from the vinyl cyanide monomer exceeds about 31 wt %, the thermoplastic resin composition can have poor flowability.

Examples of the monomer imparting processability and heat resistance may include (meth)acrylic acid, maleic anhydride, and N-substituted maleimide, without being limited thereto. These may be used alone or as a mixture thereof.

When the monomer imparting processability and heat resistance is used, the monomer mixture can include the monomer imparting processability and heat resistance in an amount of about 15 wt % or less, for example, about 0.1 wt % to about 10 wt %, based on the total weight (100 wt %)

of the monomer mixture. In some embodiments, the monomer mixture can include the monomer imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer imparting processability and heat resistance can be in a range from about any of the foregoing amounts to about any other of the foregoing amounts.

Within this range, the monomer imparting processability and heat resistance can impart processability and heat resistance to the thermoplastic resin composition with minimum or no deterioration in other properties.

In exemplary embodiments, the first aromatic vinyl-vinyl cyanide copolymer may have a weight average molecular weight of about 250,000 g/mol to about 450,000 g/mol, for example, about 270,000 g/mol to about 400,000 g/mol, as measured by gel permeation chromatography (GPC). If the weight average molecular weight of the first aromatic vinyl-vinyl cyanide copolymer is less than about 250,000 g/mol, the thermoplastic resin composition can have poor impact resistance, whereas if the weight average molecular weight of the first aromatic vinyl-vinyl cyanide copolymer exceeds about 450,000 g/mol, the thermoplastic resin composition can have poor flowability.

In exemplary embodiments, the thermoplastic resin composition can include the first aromatic vinyl-vinyl cyanide copolymer in an amount of about 10 wt % to about 40 wt %, for example, about 10 wt % to about 30 wt %, based on the total weight (100 wt %) of the thermoplastic resin composition, that is, the total weight of components (A) to (E). In some embodiments, the thermoplastic resin composition can include the first aromatic vinyl-vinyl cyanide copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments, the amount of the first aromatic vinyl-vinyl cyanide copolymer can be in a range from about any of the foregoing amounts to about any other of the foregoing amounts.

When the amount of the first aromatic vinyl-vinyl cyanide copolymer falls within this range, the thermoplastic resin composition can have excellent properties in terms of chemical resistance, stiffness, impact resistance, flowability, and balance therebetween.

(D) Second Aromatic Vinyl-Vinyl Cyanide Copolymer

The second aromatic vinyl-vinyl cyanide copolymer according to embodiments of the present invention can serve to improve chemical resistance and flowability of the thermoplastic resin composition in combination with the first and third aromatic vinyl-vinyl cyanide copolymers. The second aromatic vinyl-vinyl cyanide copolymer may be obtained by polymerizing a monomer mixture including an aromatic vinyl monomer and a vinyl cyanide monomer and can have a weight average molecular weight of about 70,000 g/mol to about 150,000 g/mol and can include about 33 wt % to about 42 wt % of a repeat unit derived from the vinyl cyanide monomer. For example, the second aromatic vinyl-vinyl cyanide copolymer is a copolymer containing repeat units respectively derived from an aromatic vinyl monomer and a vinyl cyanide monomer, and may be obtained by reacting the monomer mixture by any known polymerization method such that the weight average molecular weight and repeat unit content of the copolymer fall within the aforementioned ranges. The monomer mixture may further include a monomer imparting processability and heat resistance, as needed, thereby obtaining the second aromatic vinyl-vinyl cyanide copolymer further containing a repeat unit derived from the monomer imparting processability and heat resistance.

The aromatic vinyl monomer can form a repeat unit derived from the aromatic vinyl monomer through polymerization with the vinyl cyanide monomer. Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof.

The monomer mixture can include the aromatic vinyl monomer (the repeat unit derived from the aromatic vinyl monomer) in an amount of about 58 wt % to about 67 wt %, for example, about 60 wt % to about 66 wt %, based on the total weight (100 wt %) of the monomer mixture (of the second aromatic vinyl-vinyl cyanide copolymer). In some embodiments, the monomer mixture can include the aromatic vinyl monomer in an amount of about 58, 59, 60, 61, 62, 63, 64, 65, 66, or 67 wt %. Further, according to some embodiments, the amount of the aromatic vinyl monomer can be in a range from about any of the foregoing amounts to about any other of the foregoing amounts.

When the amount of the aromatic vinyl monomer falls within this range, the thermoplastic resin composition can have excellent properties in terms of chemical resistance, flowability, and the like.

The vinyl cyanide monomer can form a repeat unit derived from the aromatic vinyl monomer through polymerization with the aromatic vinyl monomer. Examples of the vinyl cyanide monomer may include acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may be acrylonitrile and/or methacrylonitrile.

The monomer mixture can include the vinyl cyanide monomer (the repeat unit derived from the vinyl cyanide monomer) in an amount of about 33 wt % to about 42 wt %, for example, about 34 wt % to about 40 wt %, based on the total weight of the monomer mixture (of the second aromatic vinyl-vinyl cyanide copolymer). In some embodiments, the monomer mixture can include the vinyl cyanide monomer in an amount of about 33, 34, 35, 36, 37, 38, 39, 40, 41, or 42 wt %. Further, according to some embodiments, the amount of the vinyl cyanide monomer can be in a range from about any of the foregoing amounts to about any other of the foregoing amounts.

If the amount of the repeat unit derived from the vinyl cyanide monomer is less than about 33 wt %, the thermoplastic resin composition can have poor chemical resistance, whereas if the amount of the repeat unit derived from the vinyl cyanide monomer exceeds about 42 wt %, the thermoplastic resin composition can have poor flowability.

Examples of the monomer imparting processability and heat resistance may include (meth)acrylic acid, maleic anhydride, and N-substituted maleimide, without being limited thereto. These may be used alone or as a mixture thereof.

When the monomer imparting processability and heat resistance is used, the monomer mixture can include the monomer imparting processability and heat resistance in an amount of about 15 wt % or less, for example, about 0.1 wt % to about 10 wt %, based on the total weight (100 wt %) of the monomer mixture. In some embodiments, the monomer mixture can include the monomer imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer imparting processability and heat resistance can be in a range from about any of the foregoing amounts to about any other of the foregoing amounts.

Within this range, the monomer imparting processability and heat resistance can impart processability and heat resistance to the thermoplastic resin composition with minimum or no deterioration in other properties.

In exemplary embodiments, the second aromatic vinyl-vinyl cyanide copolymer may have a weight average molecular weight of about 70,000 g/mol to about 150,000 g/mol, for example, about 80,000 g/mol to about 130,000 g/mol, as measured by gel permeation chromatography (GPC). If the weight average molecular weight of the second aromatic vinyl-vinyl cyanide copolymer is less than about 70,000 g/mol, the thermoplastic resin composition can have poor impact resistance, whereas if the weight average molecular weight of the second aromatic vinyl-vinyl cyanide copolymer exceeds about 150,000 g/mol, the thermoplastic resin composition can have poor flowability.

In exemplary embodiments, the thermoplastic resin composition can include the second aromatic vinyl-vinyl cyanide copolymer in an amount of about 20 wt % to about 60 wt %, for example, about 30 wt % to about 50 wt %, based on the total weight (100 wt %) of the thermoplastic resin composition, that is, the total weight of the components (A) to (E). In some embodiments, the thermoplastic resin composition can include the second aromatic vinyl-vinyl cyanide copolymer in an amount of about 20, 21, 22, 23, 24, 25, 26, 27, 28, 29, 30, 31, 32, 33, 34, 35, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the second aromatic vinyl-vinyl cyanide copolymer can be in a range from about any of the foregoing amounts to about any other of the foregoing amounts.

When the amount of the second aromatic vinyl-vinyl cyanide copolymer falls within this range, the thermoplastic resin composition can have excellent properties in terms of chemical resistance, stiffness, impact resistance, flowability, and balance therebetween.

(E) Third Aromatic Vinyl-Vinyl Cyanide Copolymer

The third aromatic vinyl-vinyl cyanide copolymer according to embodiments of the present invention can serve to improve chemical resistance and flowability of the thermoplastic resin composition in combination with the first and second aromatic vinyl-vinyl cyanide copolymers. The third aromatic vinyl-vinyl cyanide copolymer may be obtained by polymerizing a monomer mixture including an aromatic vinyl monomer and a vinyl cyanide monomer, and can have a weight average molecular weight of about 70,000 g/mol to about 150,000 g/mol and can include about 25 wt % to about 31 wt % of a repeat unit derived from the vinyl cyanide monomer. For example, the third aromatic vinyl-vinyl cyanide copolymer is a copolymer containing repeat units respectively derived from an aromatic vinyl monomer and a vinyl cyanide monomer, and may be obtained by reacting the monomer mixture by any known polymerization method such that the weight average molecular weight and repeat unit content of the copolymer fall within the aforementioned ranges. The monomer mixture may further include a monomer imparting processability and heat resistance, as needed, thereby obtaining the third aromatic vinyl-vinyl cyanide copolymer further containing a repeat unit derived from the monomer imparting processability and heat resistance.

In exemplary embodiments, the aromatic vinyl monomer can form a repeat unit derived from the aromatic vinyl monomer through polymerization with the vinyl cyanide monomer. Examples of the aromatic vinyl monomer may include styrene, α-methylstyrene, β-methyl styrene, p-methyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof.

The monomer mixture can include the aromatic vinyl monomer (the repeat unit derived from the aromatic vinyl monomer) in an amount of about 69 wt % to about 75 wt %, for example, about 70 wt % to about 74 wt %, based on the total weight (100 wt %) of the monomer mixture (of the third aromatic vinyl-vinyl cyanide copolymer). In some embodiments, the monomer mixture can include the aromatic vinyl monomer in an amount of about 69, 70, 71, 72, 73, 74, or 75 wt %. Further, according to some embodiments, the amount of the aromatic vinyl monomer can be in a range from about any of the foregoing amounts to about any other of the foregoing amounts.

When the amount of the aromatic vinyl monomer falls within this range, the thermoplastic resin composition can have excellent properties in terms of chemical resistance, flowability, and the like.

The vinyl cyanide monomer can form a repeat unit derived from the aromatic vinyl monomer through polymerization with the aromatic vinyl monomer. Examples of the vinyl cyanide monomer may include acrylonitrile, methacrylonitrile, ethacrylonitrile, phenyl acrylonitrile, α-chloroacrylonitrile, and fumaronitrile, without being limited thereto. These may be used alone or as a mixture thereof. For example, the vinyl cyanide monomer may be acrylonitrile and/or methacrylonitrile.

The monomer mixture can include the vinyl cyanide monomer (the repeat unit derived from the vinyl cyanide monomer) in an amount of about 25 wt % to about 31 wt %, for example, about 26 wt % to about 30 wt %, based on the total weight of the monomer mixture (of the third aromatic vinyl-vinyl cyanide copolymer). In some embodiments, the monomer mixture can include the vinyl cyanide monomer in an amount of about 25, 26, 27, 28, 29, 30, or 31 wt %. Further, according to some embodiments, the amount of the vinyl cyanide monomer can be in a range from about any of the foregoing amounts to about any other of the foregoing amounts.

If the amount of the repeat unit derived from the vinyl cyanide monomer is less than about 25 wt %, the thermoplastic resin composition can have poor chemical resistance, whereas if the amount of the repeat unit derived from the vinyl cyanide monomer exceeds about 31 wt %, the thermoplastic resin composition can have poor flowability.

Examples of the monomer imparting processability and heat resistance may include (meth)acrylic acid, maleic anhydride, and N-substituted maleimide, without being limited thereto. These may be used alone or as a mixture thereof.

When the monomer imparting processability and heat resistance is used, the monomer mixture can include the monomer imparting processability and heat resistance in an amount of about 15 wt % or less, for example, about 0.1 wt % to about 10 wt %, based on the total weight of the monomer mixture. In some embodiments, the monomer mixture can include the monomer imparting processability and heat resistance in an amount of 0 (the monomer is not present), about 0 (the monomer is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, or 15 wt %. Further, according to some embodiments, the amount of the monomer imparting processability and heat resistance can be in a range from about any of the foregoing amounts to about any other of the foregoing amounts.

Within this range, the monomer imparting processability and heat resistance can impart processability and heat resistance to the thermoplastic resin composition with minimum or no deterioration in other properties.

In exemplary embodiments, the third aromatic vinyl-vinyl cyanide copolymer may have a weight average molecular weight of about 70,000 g/mol to about 150,000 g/mol, for example, about 80,000 g/mol to about 130,000 g/mol, as measured by gel permeation chromatography (GPC). If the weight average molecular weight of the third aromatic vinyl-vinyl cyanide copolymer is less than about 70,000 g/mol, the thermoplastic resin composition can have poor impact resistance, whereas if the weight average molecular weight of the third aromatic vinyl-vinyl cyanide copolymer exceeds about 150,000 g/mol, the thermoplastic resin composition can have poor flowability.

In exemplary embodiments, the thermoplastic resin composition can include the third aromatic vinyl-vinyl cyanide copolymer in an amount of about 1 wt % to about 15 wt %, for example, about 1 wt % to about 10 wt %, based on the total weight (100 wt %) of the thermoplastic resin composition, that is, the total weight of components (A) to (E). In some embodiments, the thermoplastic resin composition can include the third aromatic vinyl-vinyl cyanide copolymer in an amount of about 1, 2, 3, 4, 5, 6, 7, 8, 9, 10, 11, 12, 13, 14, or 15 wt %. Further, according to some embodiments, the amount of the third aromatic vinyl-vinyl cyanide copolymer can be in a range from about any of the foregoing amounts to about any other of the foregoing amounts.

When the amount of the third aromatic vinyl-vinyl cyanide copolymer falls within this range, the thermoplastic resin composition can have excellent properties in terms of chemical resistance, stiffness, impact resistance, flowability, and balance therebetween.

(F) Rubber-Modified Aromatic Vinyl Copolymer Resin

In exemplary embodiments, the thermoplastic resin composition may further include (F) a rubber-modified aromatic vinyl copolymer resin including a rubber polymer having an average particle diameter of about 1 µm to about 10 µm to have improved impact resistance and chemical resistance. The rubber-modified aromatic vinyl copolymer resin is not the same as the first rubber-modified vinyl graft copolymer (A) and/or the second rubber-modified vinyl graft copolymer (B) described herein.

In exemplary embodiments, the rubber-modified aromatic vinyl copolymer resin may be obtained by bulk polymerization of an aromatic vinyl monomer and a monomer copolymerizable with the aromatic vinyl monomer with the rubber polymer.

Examples of the rubber polymer may include: diene rubbers (diene-based rubbery polymers) such as polybutadiene, poly(styrene-butadiene), and poly(acrylonitrile-butadiene); saturated rubbers obtained by adding hydrogen to the diene rubbers; isoprene rubbers; acrylate rubbers (acrylate-based rubbery polymers) such as polybutyl acrylate; and ethylene-propylene-diene monomer terpolymers (EPDM), without being limited thereto. These may be used alone or as a mixture thereof. For example, the rubber polymer may include a diene rubber, for example a polybutadiene rubber.

In exemplary embodiments, the rubber polymer (rubber particles) may have an average (Z-average) particle diameter of about 1 µm to about 10 µm, for example about 1 µm to about 7 µm. When the average particle diameter of the rubber polymer falls within this range, the thermoplastic resin composition can have further improved impact resistance and chemical resistance.

In exemplary embodiments, the rubber-modified aromatic vinyl copolymer resin can include the rubber polymer in an amount of about 5 wt % to about 40 wt %, for example, about 10 wt % to about 30 wt %, based on the total weight (100 wt %) of the rubber-modified aromatic vinyl copolymer resin. In some embodiments, the rubber-modified aromatic vinyl copolymer resin can include the rubber polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments, the amount of the rubber polymer can be in a range from about any of the foregoing amounts to about any other of the foregoing amounts.

When the amount of the rubber polymer falls within this range, the thermoplastic resin composition can have further improved impact resistance and chemical resistance.

Examples of the aromatic vinyl monomer may include styrene, α-methylstyrene, β-methyl styrene, p-methyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof.

The rubber-modified aromatic vinyl copolymer resin can include the aromatic vinyl monomer in an amount of about 15 wt % to about 94 wt %, for example about 20 wt % to about 80 wt %, and as another example about 30 wt % to about 60 wt %, based on the total weight (100 wt %) of the rubber-modified aromatic vinyl copolymer resin. In some embodiments, the rubber-modified aromatic vinyl copolymer resin can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments, the amount of the aromatic vinyl monomer can be in a range from about any of the foregoing amounts to about any other of the foregoing amounts.

When the amount of the aromatic vinyl monomer falls within this range, the thermoplastic resin composition can have further improved impact resistance and flowability.

Examples of the monomer copolymerizable with the aromatic vinyl monomer may include: a vinyl cyanide monomer such as acrylonitrile, methacrylonitrile, and ethacrylonitrile; (meth)acrylic acid; maleic anhydride; and N-substituted maleimide, without being limited thereto. These may be used alone or as a mixture thereof.

The rubber-modified aromatic vinyl copolymer resin can include the monomer copolymerizable with the aromatic vinyl monomer in an amount of about 1 wt % to about 50 wt %, for example, about 5 wt % to about 45 wt %, and as another example about 10 wt % to about 30 wt %, based on the total weight (100 wt %) of the rubber-modified aromatic vinyl copolymer resin. In some embodiments, the rubber-modified aromatic vinyl copolymer resin can include the monomer copolymerizable with the aromatic vinyl monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the monomer copolymerizable with the aromatic vinyl monomer can be in a range from about any of the foregoing amounts to about any other of the foregoing amounts.

When the amount of the monomer copolymerizable with the aromatic vinyl monomer falls within this range, the thermoplastic resin composition can have further improved impact resistance and flowability.

In exemplary embodiments, the thermoplastic resin composition can include the rubber-modified aromatic vinyl copolymer resin in an amount of about 20 parts by weight or less, for example, about 1 part by weight to about 10 parts by weight, relative to about 100 parts by weight of the thermoplastic resin composition, that is, components (A) to (E). In some embodiments, the thermoplastic resin composition can include the rubber-modified aromatic vinyl copolymer resin in an amount of 0 (the rubber-modified aromatic vinyl copolymer resin is not present), about 0 (the rubber-modified aromatic vinyl copolymer resin is present), 1, 2, 3, 4, 5, 6, 7, 8, 9, 10, 11, 12, 13, 14, 15, 16, 17, 18, 19, or 20 parts by weight. Further, according to some embodiments, the amount of the rubber-modified aromatic vinyl copolymer resin can be in a range from about any of the foregoing amounts to about any other of the foregoing amounts.

Within this range, the rubber-modified aromatic vinyl copolymer resin can further improve impact resistance and flowability of the thermoplastic resin composition.

In exemplary embodiments, the thermoplastic resin composition may further include one or more additives, such as but not limited to a flame retardant, an antioxidant, a lubricant, a release agent, a nucleating agent, an antistatic agent, a stabilizer, a colorant, and combinations thereof, without altering the effects of the present invention. The thermoplastic resin composition can include the additive(s) in an amount of about 20 parts by weight or less, for example, about 0.1 parts by weight to about 10 parts by weight, relative to about 100 parts by weight of the thermoplastic resin composition, that is, components (A) to (E), without being limited thereto.

In exemplary embodiments, the thermoplastic resin composition may have a tensile strength of about 450 MPa to about 600 MPa, for example, about 470 MPa to about 580 MPa, as measured on a 3.2 mm thick specimen in accordance with ASTM D638.

In exemplary embodiments, the thermoplastic resin composition may have a notched Izod impact strength of about 25 kgf·cm/cm to about 40 kgf·cm/cm, for example, about 25 kgf·cm/cm to about 35 kgf·cm/cm, as measured on a ⅛" thick specimen in accordance with ASTM D256.

In exemplary embodiments, the thermoplastic resin composition may have a fracture strain ratio ($\varepsilon 1/\varepsilon 0$) of about 65% to about 90%, for example about 70% to about 85%, as measured in accordance with ASTM D543-06 using a 3.2 mm thick specimen, wherein $\varepsilon 1$ is fracture strain measured when the specimen not exposed to a chemical reagent is subjected to tensile testing and $\varepsilon 0$ is fracture strain measured when the specimen exposed to a chemical reagent is subjected to tensile testing, wherein tensile testing is conducted at a tensile rate of 5 mm/min in accordance with ASTM D638.

A molded article according to the present invention is formed of the thermoplastic resin composition as set forth above. The thermoplastic resin composition according to the present invention may be prepared by any known method of preparing thermoplastic resin compositions. For example, the aforementioned components and, optionally, other additives can be mixed, followed by melt extrusion in an extruder, thereby preparing a thermoplastic resin composition in pellet form. The prepared pellets may be produced into various molded articles (products) by various molding methods, such as injection molding, extrusion, vacuum molding, and casting. Such molding methods are well known to those skilled in the art. The molded article may be used in fields such as interior/exterior materials of electric/electronic products, automobile parts, and/or consumer products, without limitation. The molded article can prevent chemical erosion and cracking caused by eco-friendly foaming agents such as hydrofluoroolefin (HFO) foaming agents and can have excellent properties in terms of chemical resistance, stiffness, impact resistance, and the like. Thus, the molded article can be useful as a refrigerator inner case.

Next, the present invention will be described in more detail with reference to the following examples. It should be understood that these examples are provided for illustration only and are not to be construed in any way as limiting the present invention.

EXAMPLE

Details of components used in the following Examples and Comparative Examples are as follows:

(A) First Rubber-Modified Vinyl Graft Copolymer

An acrylonitrile-butadiene-styrene graft copolymer (g-ABS) prepared by grafting 42 wt % of styrene and acrylonitrile (styrene/acrylonitrile: 75 wt %/25 wt %) to 58 wt % of polybutadiene rubber having an average particle diameter of 0.3 μm (B) Second Rubber-Modified Vinyl Graft Copolymer An acrylonitrile-butadiene-acrylonitrile graft copolymer (g-ASA) prepared by grafting 50 wt % of styrene and acrylonitrile (styrene/acrylonitrile: 73 wt %/27 wt %) to 50 wt % of polybutyl acrylate rubber having an average particle diameter of 0.2 μm (C) First Aromatic Vinyl-Vinyl Cyanide Copolymer A resin (weight average molecular weight: 330,000 g/mol) prepared by polymerizing 72 wt % of styrene with 28 wt % of acrylonitrile (D) Second Aromatic Vinyl-Vinyl Cyanide Copolymer A resin (weight average molecular weight: 120,000 g/mol) prepared by polymerizing 60 wt % of styrene with 40 wt % of acrylonitrile (E) Third Aromatic Vinyl-Vinyl Cyanide Copolymer A resin (weight average molecular weight: 120,000 g/mol) prepared by polymerizing 72 wt % of styrene with 28 wt % of acrylonitrile (F) Rubber-Modified Aromatic Vinyl Copolymer Resin An acrylonitrile-butadiene-styrene copolymer (ABS) resin prepared by mass polymerization of 15 wt % of polybutadiene rubber having an average particle diameter of 2 μm and 85 wt % with a styrene/acrylonitrile copolymer (styrene/acrylonitrile: 75 wt %/25 wt %)

Examples 1 to 2 and Comparative Examples 1 to 4

The aforementioned components are mixed in amounts as listed in Table 1, followed by melt extrusion in a twin screw type extruder (L/D=35, φ=45 mm) at 230° C., thereby preparing pellets. The prepared pellets are dried at 80° C. for 4 hours or more, followed by injection molding using an injection machine at an injection temperature of 230° C. and a mold temperature of 60° C., thereby preparing a specimen. The prepared specimen is evaluated as to the following properties, and results are shown in Table 1.

Property Evaluation (1) Stiffness (unit: MPa): Tensile strength is measured on a 3.2 mm thick specimen at a tensile rate of 5 mm/min in accordance with ASTM D638.

(2) Impact resistance (unit: kgf·cm/cm): Notched Izod impact strength is measured on a ⅛" thick notched specimen in accordance with ASTM D256.

(3) Chemical resistance (unit: %): Using a 3.2 mm thick specimen for measurement of tensile strength, a ratio of fracture strain ($\varepsilon 1$) measured when the specimen not exposed to a chemical reagent is subjected to tensile testing to fracture strain ($\varepsilon 0$), measured when the specimen exposed to a chemical reagent is subjected to tensile testing, that is, a fracture strain ratio ($\varepsilon 1/\varepsilon 0$), is determined in accordance with ASTM D543-06 and expressed in %. Here, the specimen is placed on a curved steel jig and then bent at a middle portion thereof to be deformed by 1%, followed by clamping a tip of the specimen, and then a cotton pad wetted with about 5 ml of a test solution is placed at the center of the deformed specimen for 3 days, thereby exposing the specimen to a chemical reagent. As the chemical reagent, Solstice® LBA available from Honeywell International Inc. is used, and tensile testing is performed at a tensile rate of 5 mm/min in accordance with ASTM D638.

TABLE 1

|  | Example | | Comparative Example | | | |
|---|---|---|---|---|---|---|
|  | 1 | 2 | 1 | 2 | 3 | 4 |
| (A) (wt %) | 20 | 20 | 20 | 20 | 20 | 20 |
| (B) (wt %) | 5 | 5 | 5 | 5 | 5 | 5 |
| (C) (wt %) | 30 | 30 | 75 | — | — | — |
| (D) (wt %) | 40 | 40 | — | 75 | — | — |
| (E) (wt %) | 5 | 5 | — | — | 75 | 75 |
| (F) (parts by weight) | — | 5 | — | — | — | 5 |
| Tensile strength (MPa) | 500 | 490 | 480 | 510 | 480 | 470 |
| Notched Izod impact strength (kgf · cm/cm) | 30 | 32 | 31 | 21 | 27 | 29 |
| Fracture strain ratio (%) | 71 | 82 | 54 | 58 | 42 | 47 |

From the results shown in Table 1, it can be seen that the thermoplastic resin compositions (Examples 1 and 2) according to the present invention have excellent properties in terms of stiffness, impact resistance, chemical resistance, and balance therebetween.

Conversely, it can be seen that the thermoplastic resin compositions of Comparative Examples 1 to 4 have poor properties in terms of chemical resistance or impact resistance, as compared with those of Examples.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
about 10 wt % to about 30 wt % of a first rubber-modified vinyl graft copolymer obtained by grafting a monomer mixture comprising an aromatic vinyl monomer and a vinyl cyanide monomer to a diene rubber polymer;
about 1 wt % to about 15 wt % of a second rubber-modified vinyl graft copolymer obtained by grafting a monomer mixture comprising an aromatic vinyl monomer and a vinyl cyanide monomer to an acrylate rubber polymer;
about 10 wt % to about 40 wt % of a first aromatic vinyl-vinyl cyanide copolymer having a weight average molecular weight of about 250,000 g/mol to about 450,000 g/mol and including about 25 wt % to about 31 wt % of a repeat unit derived from a vinyl cyanide monomer;
about 20 wt % to about 60 wt % of a second aromatic vinyl-vinyl cyanide copolymer having a weight average molecular weight of about 70,000 g/mol to about 150,000 g/mol and including about 33 wt % to about 42 wt % of a repeat unit derived from a vinyl cyanide monomer; and
5 wt % to about 15 wt % of a third aromatic vinyl-vinyl cyanide copolymer having a weight average molecular weight of about 70,000 g/mol to about 150,000 g/mol and including about 25 wt % to about 31 wt % of a repeat unit derived from a vinyl cyanide monomer, each based on 100 wt % of the thermoplastic resin composition,
wherein the thermoplastic resin composition has a fracture strain ratio $\varepsilon 1/\varepsilon 0$ of about 65% to about 90%, as measured in accordance with ASTM D543-06 using a 3.2 mm thick specimen, wherein $\varepsilon 1$ is fracture strain measured when the specimen not exposed to a chemical reagent is subjected to tensile testing and $\varepsilon 0$ is fracture strain measured when the specimen exposed to a chemical reagent is subjected to tensile testing, wherein tensile testing is conducted at a tensile rate of 5 mm/min in accordance with ASTM D638.

2. The thermoplastic resin composition according to claim 1, wherein each of the diene rubber polymer and the acrylate rubber polymer has an average particle diameter of about 0.1 μm to about 0.4 μm.

3. The thermoplastic resin composition according to claim 1, further comprising: a rubber-modified aromatic vinyl copolymer resin comprising a rubber polymer having an average particle diameter of about 1 μm to about 10 μm.

4. The thermoplastic resin composition according to claim 3, comprising the rubber-modified aromatic vinyl copolymer resin in an amount of about 1 part by weight to about 10 parts by weight relative to about 100 parts by weight of the thermoplastic resin composition.

5. The thermoplastic resin composition according to claim 1, wherein the thermoplastic resin composition has a tensile strength of about 450 MPa to about 600 MPa, as measured on a 3.2 mm thick specimen in accordance with ASTM D638.

6. The thermoplastic resin composition according to claim 1, wherein the thermoplastic resin composition has a notched Izod impact strength of about 25 kgf·cm/cm to about 40 kgf·cm/cm, as measured on a ⅛" thick specimen in accordance with ASTM D256.

7. A molded article formed of the thermoplastic resin composition according to claim 1.

8. The molded article according to claim 7, wherein the molded article is an inner case of a refrigerator.

9. The thermoplastic resin composition according to claim 1, wherein the thermoplastic resin composition has a fracture strain ratio $\varepsilon 1/\varepsilon 0$ of about 70% to about 85%, as measured in accordance with ASTM D543-06 using a 3.2 mm thick specimen, wherein ε1 is fracture strain measured when the specimen not exposed to a chemical reagent is subjected to tensile testing and ε0 is fracture strain measured when the specimen exposed to a chemical reagent is subjected to tensile testing, wherein tensile testing is conducted at a tensile rate of 5 mm/min in accordance with ASTM D638.

10. The thermoplastic resin composition according to claim 1, wherein each of the first aromatic vinyl-vinyl cyanide copolymer and the third aromatic vinyl-vinyl cyanide copolymer include about 25 wt % to about 30 wt % of the repeat unit derived from the vinyl cyanide monomer.

11. The thermoplastic resin composition according to claim 10, wherein each of the first aromatic vinyl-vinyl cyanide copolymer and the third aromatic vinyl-vinyl cyanide copolymer include about 25 wt % to about 28 wt % of the repeat unit derived from the vinyl cyanide monomer.

* * * * *